United States Patent [19]
Geisler

[11] 4,404,839
[45] Sep. 20, 1983

[54] TESTING DEVICE FOR FORCE MEASURING APPARATUS

[75] Inventor: Erich Geisler, Polling, Fed. Rep. of Germany

[73] Assignee: Marker-Patentverwertungsgesellschaft mbH., Baar, Switzerland

[21] Appl. No.: 232,366

[22] Filed: Feb. 6, 1981

[30] Foreign Application Priority Data

Feb. 8, 1980 [DE] Fed. Rep. of Germany ....... 3004729

[51] Int. Cl.³ ............................................. G01L 25/00
[52] U.S. Cl. ....................................... 73/1 B; 73/1 C; 73/862.02
[58] Field of Search ................... 73/1 B, 1 C, 862.01, 73/862.02, 862.52, 862.53, 862.08; 116/204, 212

[56] References Cited

U.S. PATENT DOCUMENTS 2,909,055 10/1959 Fish ........................................ 73/1 C

OTHER PUBLICATIONS

Atkinson et al., "Calibrator for Terminal or Wire Wrap Pull Test Set", Western Electric Technical Digest No. 20, Oct. 1970.

*Primary Examiner*—Charles A. Ruehl
*Attorney, Agent, or Firm*—Squire, Sanders & Dempsey

[57] ABSTRACT

To test the setting of safety ski bindings, a force testing device comprises a permanent magnet securable to a binding. The attractive force of the permanent magnet holds a soft iron plate comprising force engagement means on which the force producer of the binding can act.

5 Claims, 2 Drawing Figures

TESTING DEVICE FOR FORCE MEASURING APPARATUS

Force measuring apparatus, particularly for testing the setting of, for example, safety ski bindings mounted on skis, must function as accurately as possible because only a narrow tolerance range is permissible for example for the releasing force to be set on a safety ski binding.

Consequently, it is necessary to test the apparatus from time to time to ensure that they function properly. This has hitherto been done in various ways.

In one method, one uses calibrated test samples. This method has various faults and disadvantages, especially in the case of safety ski bindings. Disturbing influences such as the sole of the boot, sole holder setting, sole pressure, lead to inaccurate and irregular results. In addition, the large range of setting calls for at least two test samples.

A second possibility of testing is the use of weights. This method is cumbersome and inconvenient because large weights are necessary.

The owner or user of such force meauring apparatus cannot be expected to use these testing methods; nor can the manufacturer or seller of the apparatus. In general, testing by the manufacturer or in special workshops is impossible for obvious reasons.

It is therefore the purpose of the present invention to provide a testing device for force measuring apparatus that is simple and insensitive to disruptive influences. The device should maintain predetermimed forces exactly and permanently and it should be possible to manipulate it conveniently and rapidly.

According to the invention, such a testing device is in the form of a permanent magnet which is securable to the apparatus and, by its attractive force, holds a soft iron plate having force engagement means on which the force producer of the apparatus can act.

With such a device, the owner or user of a force measuring apparatus can himself rapidly and simply test his apparatus. The small volume of the testing device also makes it possible for it to be kept by agents and customer service mechanics.

In a constructional embodiment of the inventive concept, the permanent magnet can be fixably attached to a mounting plate which can be located on the apparatus.

An advantageous construction of the testing device is obtained in that the permanent magnet is a hollow cylinder and the soft iron plate is a circular disc. The disc carries a concentric pin of non-magnetic material which fits into the permanent magnet. The pin, which centers or locates the soft iron plate, relative to the permanent magnet at the same time serves as the force engagement means. A pressure pin of the force measuring apparatus can act on its free end. If, at the instant when the soft iron plate becomes detached from the permanent magnet the force indication of the measuring apparatus is the same as the detaching force, the measuring apparatus is still functioning accurately. However, if this is not the case, it must be re-adjusted.

To permit tensile forces to be measured with the testing device, in a development of the invention the soft iron plate may carry a connecting eye for a tension member on the side opposite to the permanent magnet.

For different applications of the testing device it may be desirable for the force engagement means to comprise a lever mounted on the mounting plate and carrying the soft iron plate at its free end. Different forces can be checked by varying the force arm. To avoid extensive modifications or a multiplicity of testing devices when tensile as well as compressive forces are to be checked, the lever may be two-armed.

To ensure that the holding force of the permanent magnet is always constant, a further feature of the invention provides for the permanent magnet to have three or more uniformly shaped nodules arranged symmetrically on its attraction surface. These nodules create an air gap between the magnet and the soft iron plate and act to retain the soft iron plate at a constant distance from the permanent magnet.

Finally, different forces can be tested with the device of the invention if the air gap between the permanent magnet and the soft iron plate is variable. This can be achieved by using spacer foils of non-magnetic material.

Two examples of the invention will now be described with reference to the accompanying drawing, wherein.

Figure 1:
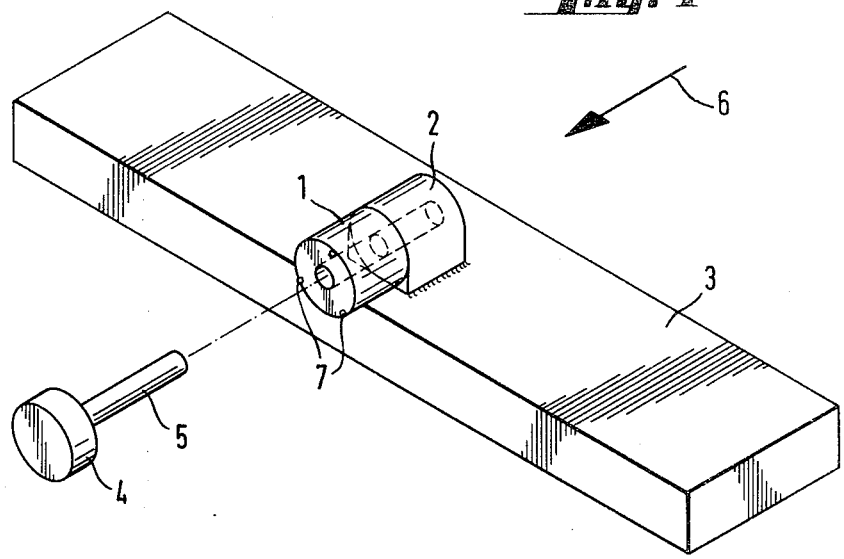
FIG. 1 is a pictorial view of a testing device according to this invention.

The testing device of FIG. 1 serves particularly for checking force measuring apparatus for testing the setting of, for example, safety ski bindings mounted on skis. For this reason, the permanent magnet 1 of the invention is secured by means of a mounting 2 on a base means in the form of a mounting plate 3 having roughly the same dimensions as a ski section at its binding zone. The permanent magnet is preferably a hollow cylinder. An associated soft iron plate 4 is in the form of a circular disc and carries a concentric pin 5 of non-magnetic material such as aluminum. This pin is shaped to fit into the permanent magnet and can therefore center or locate the soft iron plate in relation thereto. The pin extends through the permanent magnet and into the mounting 2, which for this purpose has a hole. In this way, the pin forms the force engagement means of the testing device.

In the same way as a ski, the mounting plate 3 can be secured to the force measuring apparatus to be tested so that a pressure pin of the measuring apparatus can enter the hole of the mounting in the direction of the arrow 6 and made to act on the end of the pin. Since the permanent magnet possesses an accurately defined attracting force, upon actuation of the force measuring apparatus it is therefore possible to determine in a simple manner whether the force applied by the force measuring apparatus is correctly indicated at the instant the soft iron plate 4 becomes detached. One advantage of the force measuring apparatus according to the invention is that the peak of the force can be reproduced exactly. To be as certain as possible that the air gap between the permanent magnet 1 and the soft iron plate 4 does not change unintentionally, for example on account of dust deposits, the attracting surface of the permanent magnet carries three small nodules 7 arranged at equal spacings from each other. On the other hand, an intentional change in the air gap to produce different attracting forces can be achieved by using spacer foils of non-magnetic material corresponding in shape to the attracting surface of the permanent magnet and pushed over the pin 5.

To enable this testing device also to be employed for measuring tensile forces, the side of the soft iron plate 4 remote from the permanent magnet 1 is provided with a connecting eye (not shown) to which a force measuring apparatus may be attached.

Figure 2:
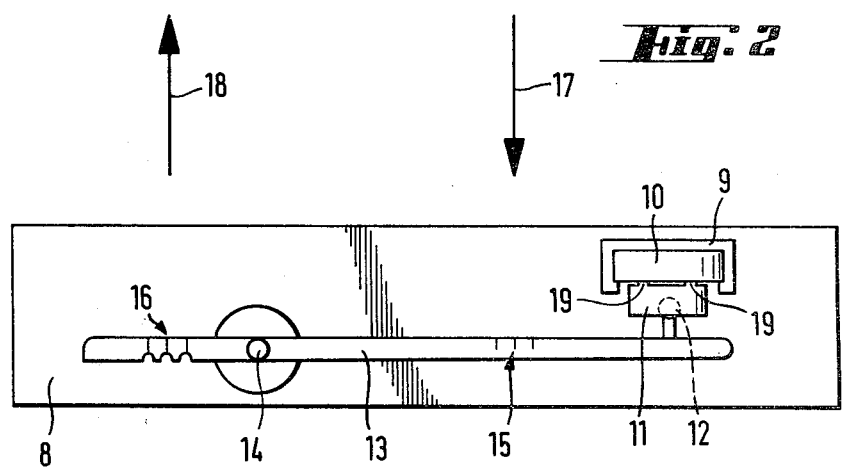
FIG. 2 is a plan view of a second embodiment of testing device.

The testing device shown in FIG. 2 likewise possesses a mounting plate 8 which can be immovably connected in any desired suitable manner to the force meauring apparatus to be tested. Such a measuring apparaus can for example again serve to test the setting of for example safety ski bindings mounted on skis. A permanent magnet 10 is secured to the mounting plate by means of a holder 9 of non-magnetic material. A soft iron plate 11 is connected by a ball joint 12 to a lever 13 of which the pivot pin 14 is vertically secured to the mounting plate 8. In the same way as the holder 9, the lever 13 is of non-magnetic material. In this construction, the lever 13 serves as the force engagement means. To enable different forces to be tested, two force scales 15, 16 are provided. The graduations of the scale 15 serve as points of engagement for compression forces acting in the direction of the arrow 17 whereas the graduations of the scale 16 serve as points of engagement for tensile forces acting in the direction of the arrow 18.

In this construction, three nodules 19 are provided on the soft iron plate 11 to maintain a constant air gap between the permanent magnet and the soft iron plate.

I claim:

1. A testing device for force measuring apparatus, said testing device comprising:
    base means;
    a magnet fixed to said base means;
    plate means of ferro magnetic material magnetically attracted to said magnet;
    force engaging means attached to said plate means for receiving applied forces; and
    spacing means for maintaining a uniform gap between said plate means and said magnet; wherein;
    said force engaging means urges said plate means from said magnet on the application of force to said force engaging means.

2. A testing device according to claim 1, wherein said magnet is a hollow cylindrical magnet; said plate means comprises a circular disc; and said engaging means comprises a rod attached to said disc and slidably mountable in said cylindrical magnet.

3. A testing device according to claim 1, wherein said engaging means comprises a lever pivotally mounted to said base means and attached on one end to said plate means.

4. A testing device according to claim 3, said lever having force engagement points on each side of its pivot axis to which applied forces are selectively applied.

5. A testing device according to claim 1, claim 2, or claim 3, wherein said spacing means comprises uniformly shaped nodules attached to said magnet.

* * * * *